United States Patent [19]

Hansen

[11] Patent Number: 5,535,993

[45] Date of Patent: Jul. 16, 1996

[54] UNIVERSAL HIGH DAMPENING LOAD LEVELING APPARATUS

[76] Inventor: Leon L. Hansen, P.O. Box 184, Pickstown, S. Dak. 57367

[21] Appl. No.: 296,787

[22] Filed: Aug. 26, 1994

[51] Int. Cl.$^6$ ................................................ B60G 11/34
[52] U.S. Cl. ............................................. 267/30; 267/263
[58] Field of Search .............................. 267/29, 30, 263, 267/36.1, 152, 153, 47; 280/718, 699, 694

[56] References Cited

U.S. PATENT DOCUMENTS

| | | | |
|---|---|---|---|
| 1,797,858 | 3/1931 | Froesch | 267/30 |
| 2,222,001 | 11/1940 | Schulze | 267/30 |
| 4,671,535 | 6/1987 | Hanson et al. | 267/30 X |
| 4,988,080 | 1/1991 | Shah | 267/30 |

FOREIGN PATENT DOCUMENTS 0898154  11/1953  Germany ................................. 267/30

*Primary Examiner*—Robert J. Oberleitner
*Assistant Examiner*—Peter M. Poon
*Attorney, Agent, or Firm*—Suiter & Associates

[57] ABSTRACT

An attachment for a vehicle suspension system of a type having a frame, a pair of leaf springs attached at the ends thereof to each side of the frame and operatively attached centrally thereof to the rear axle housing. An abutment structure is attached to the frame on each side thereof just above the portion of the leaf springs on each side of the frame. These abutment structures are positioned generally between the rear axle and rear end of the leaf springs for contacting an upper portion of the respective leaf spring under heavy load conditions to effectively shorten the operative length of the leaf springs automatically whereby the load will be effectively redistributed from rear to front upon engagement of the abutment structures with the top of the leaf springs. Structure is additionally provided for interchanging the operative portion of the invention both to compensate for differences in length between the frame and leaf springs of different vehicles and to provide for an effective shock adsorption capability on a variety of surfaces.

6 Claims, 2 Drawing Sheets

UNIVERSAL HIGH DAMPENING LOAD LEVELING APPARATUS

TECHNICAL FIELD

The present invention is generally related to apparatus adapted to modify vehicle suspension systems and more particularly to an improved high dampening load leveling apparatus which acts to shift a vehicle's suspension system fulcrum forward.

BACKGROUND ART

When utility vehicles, having a rigid frame extending from the cab through the bed, are loaded with cargo exceeding the weight specifications of the vehicles suspension system, the rear of the vehicle experiences a downward movement while the front of the vehicle correspondingly rises. This shift of the suspension system toward its outer extremes defeats its purpose of providing a smooth and stable ride. This shifting action causes a vehicle to become unstable as there is little strength remaining to the leaf suspension system to safely support the vehicle as it moves across uneven surfaces.

To compensate for this problem, some vehicle owners elect to order costly heavy-duty suspension systems while others choose to equip their vehicle with overload spring systems. The relative cost of both these remedies is great, as they are only necessary during heavy load bearing conditions exceeding the outer limitations of the standard suspension system working parameters.

U.S. Pat. No. 3,069,149 discloses a form of auxiliary overload structure including a pair of rubber bumpers which make contact upon the over compression of the suspension coil springs under heavy load conditions. Upon contact between the bumpers, the rear of the vehicle is prevented from shifting further downward. Although this disclosure effectively provides for a more level vehicle under heavy load conditions, when the rubber bumpers are in contact and the vehicle hits a bump, there is little spring action within the rubber bumpers to provide for shock absorption.

U.S. Pat. No. 3,850,444 to Wright discloses an alternative overload spring arrangement. This invention provides for the addition of an extra spring member designed to work in conjunction with the standard equipment so as to emulate a suspension system designed with heavier coil springs. While effectively providing for vehicle stability and shock adsorption, this disclosure fails to modify the behavior of the leaf springs provided as standard equipment.

U.S. Pat. No. 4,671,535, by the present inventor, describes an abutment structure attached to a vehicle frame which comes into direct contact with a vehicle's leaf springs. This system effectively provides for a forward shift of the suspension system's fulcrum upon contact between the leaf spring and the abutment structure. Although the device effectively modifies the behavior of the standard suspension system and increases its load carrying capability, it is relatively expensive and difficult to install. Accordingly, there remains a need for an inexpensive apparatus which provides shock absorption and effectively increases the load bearing capabilities of standard vehicular suspension systems.

DISCLOSURE OF THE INVENTION

The present invention is generally related to an apparatus designed as an attachment for a utility vehicle suspension system of a type having a frame, a pair of leaf springs attached at the ends thereof and operatively attached centrally thereof to the rear axle housing. The invention utilizes a polyurethane abutment structure attachable to the frame just above the leaf springs. The abutment structures are positioned on the frame at a position generally between the rear axle housing and the rear end of the leaf springs. The operative portion of the invention extends below the frame in order to make contact with the upper surface of the leaf spring under excessive load bearing conditions. Once the leaf spring is in contact with the abutment structure, the spring's operative length will be effectively shortened.

Structure has been provided for interchanging the portion of the invention coming directly into contact with the leaf spring with relative ease. This structure will enable one to periodically provide for the variations in distance between the leaf spring and frame corresponding to the many different sizes and shapes of vehicles. One will be able to readily vary the distance between the operative end of the abutment structure and the leaf spring in order to provide for varying load carrying capabilities without sacrificing comfort and control under different road conditions. Additionally, by varying the physical properties of the polymer utilized to fabricate the abutment structure (polyurethane is utilized in production of the operative portion in the invention) one may provide for instantaneous compensation to any momentary changes in the vibrational energy produced by the suspension system through its interactions with load size and surface conditions.

An object of the present invention is to provide an improved vehicle suspension system.

Another object of the present invention is to provide a load equalizer and stabilizer system for leaf spring suspension systems which are fully adjustable to many different sizes and shapes of trucks under a wide range of load conditions.

A further object of the present invention is to provide varying shock adsorption capability adaptable to variations in leaf spring length, load size and road conditions.

A still further object of the present invention is to provide a vehicle suspension system of the type which is adjustable to vary the distance between an abutment structure and a leaf spring whereby it may be adjusted to the load necessary to effect an automatic load redistribution to occur.

Other objects, advantages and novel features of the present invention will become apparent from the following detailed description of the invention, when considered in conjunction with the drawings.

DETAILED DESCRIPTION

Figure 1:
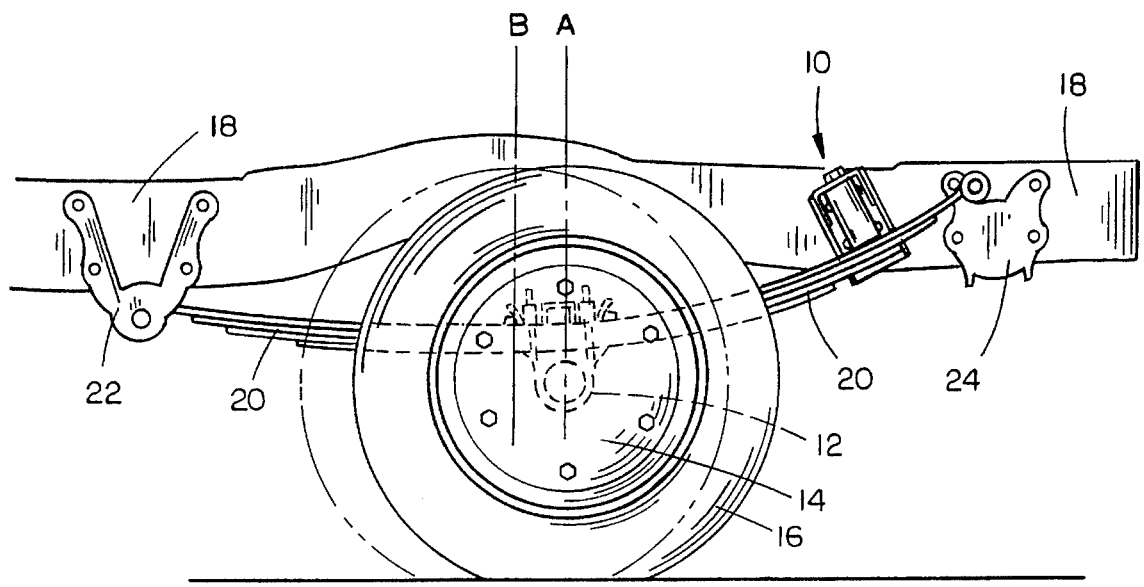
FIG. 1 is a side elevational view of a truck frame having a leaf spring suspension system and the present invention mounted operatively thereto.

Referring now to the drawings, wherein like reference numerals designate identical or corresponding views, FIG. 1 demonstrates a typical vehicle suspension system consisting of a rear axle housing (12), wheel (14) and tire (16) mounted on a longitudinal frame member (18). Leaf springs (20) may be seen as operatively attached at the front of the frame (18) by attaching mechanism (22) and at the rear thereof by mounting member (24). Consequently when the wheel (14) hits a bump, it may move up and down with respect to the frame (18) along line (A) through a vertical motion of the leaf springs (20).

The present invention (10) may be operatively attached to the longitudinal frame member (18) at a position generally between the rear axle housing (12) and the rear mounting member (24). The invention (10) should be positioned at an angle causing it's operative portion known as the tube (38) to be perpendicular to the upper portion of the leaf spring (20) found immediately below. As the distance between the rear axle housing (12) and the invention (10) varies with each vehicle, some representative distances are provided:

TABLE 1

| Vehicle | Distance |
| --- | --- |
| GMC - Chevrolet Pick Up | 16"–18" |
| GMC - Chevrolet Van | 17'–18' |
| Dodge Van - Pick Up | 15"–17" |
| Ford Pick Up | 20" |
| Ford Van | 22" |

Through the use of simple bolts, the invention (10) may be easily mounted to the vehicle's longitudinal frame member (18). Once holes corresponding to the plurality of openings (28) in the vertical mounting plate (26) have been drilled through the longitudinal frame member (18), bolts may be fed through both sets of openings securing the invention (10) safely to the vehicle.

Figure 2:
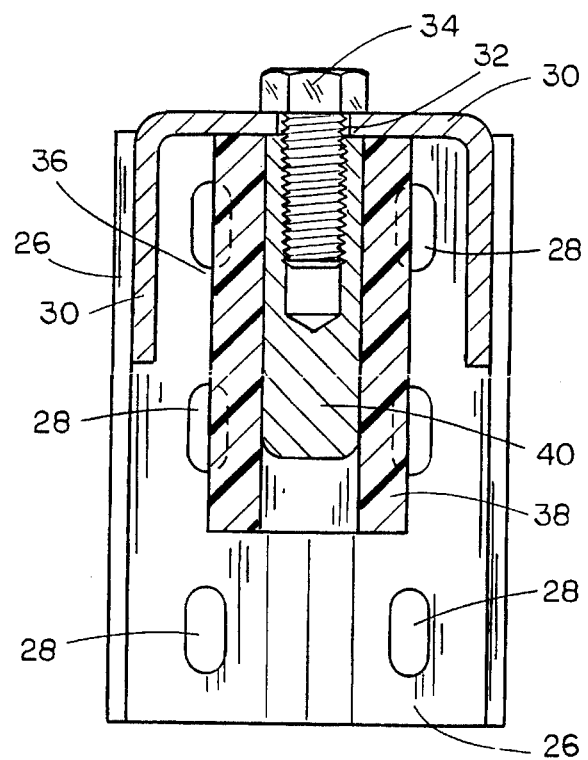
FIG. 2 is a front elevational cross section view of the present invention.
Figure 3:
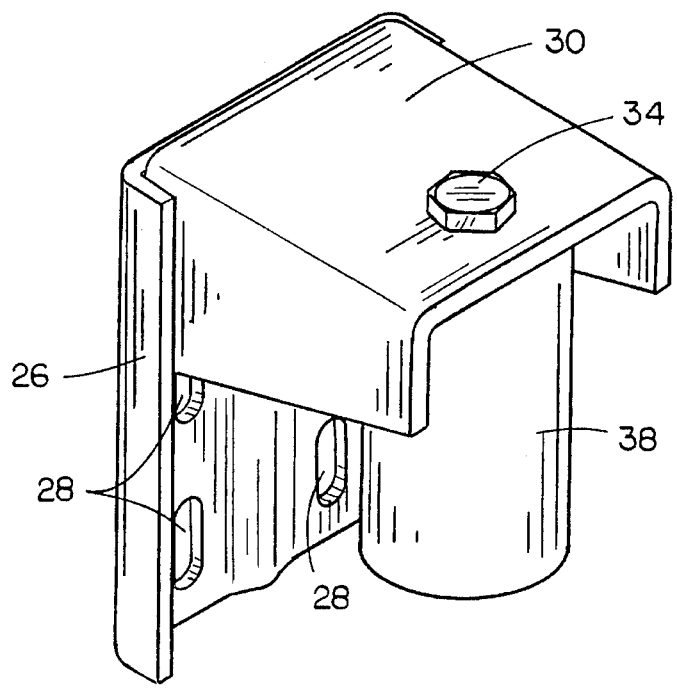
FIG. 3 is a perspective view of the present invention.
Figure 4:
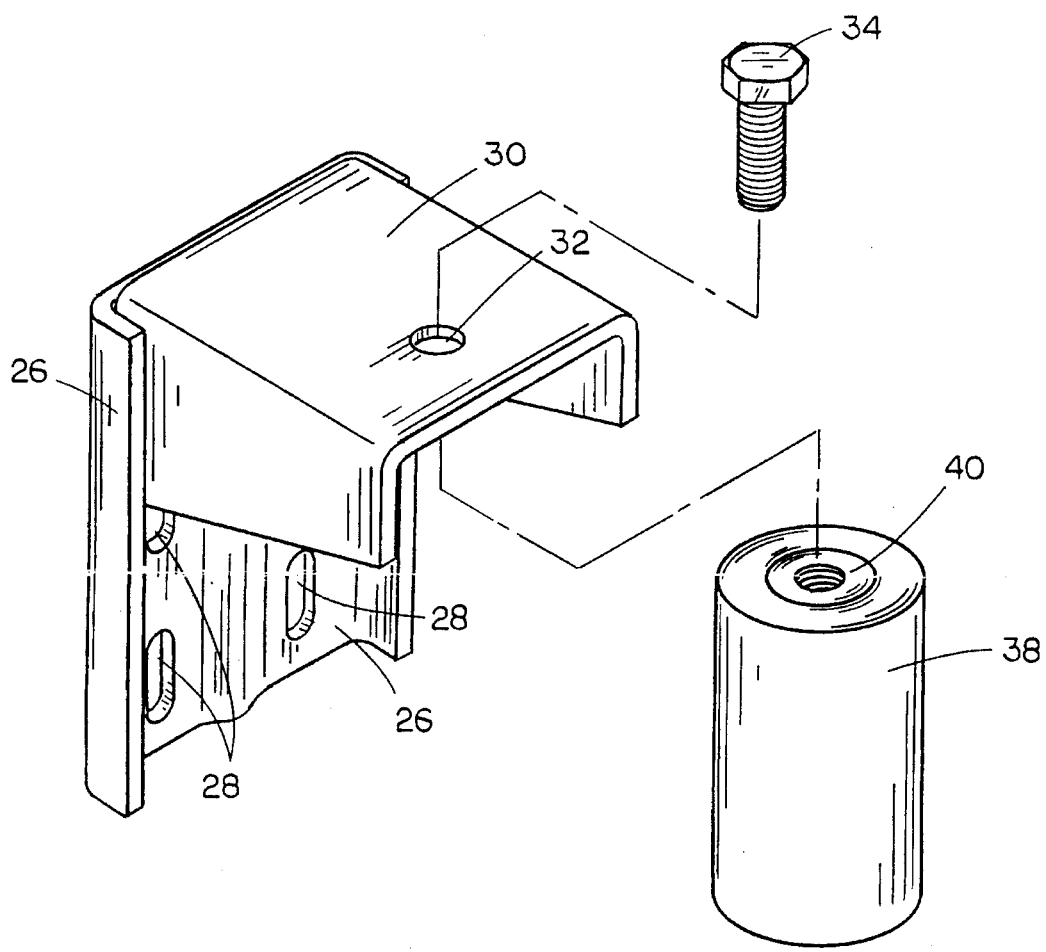
FIG. 4 is a perspective exploded view similar to FIG. 3, but in readiness to be attached to a leaf spring suspension system of a vehicle.

Referring to FIG. 2 it is noted that in the preferred embodiment of the present invention (10), the vertical mounting plate (26) is welded to an upper horizontal plate (30). Once the vertical mounting plate (26) is mounted to the longitudinal frame member (18), it, along with the upper horizontal plate (30), form a rigid brace between the vehicle and the operative portion of the invention (10) known as the polymer tube (38) as may be seen in FIG. 1. Once the vertical mounting plate (26) is connected to the horizontal frame member (18) for example as shown in FIG. 1, then the vertical length of the element (36) as determined by the length of the polymer tube (38) is chosen in order to position it by a predetermined amount from the leaf spring. Central to the top horizontal plate (30) is a single opening (32) whereby an elongated threaded stud (34) may be received in order to secure the entire leaf spring abutment element (36) in part consisting of the polymer tube (38) to the upper horizontal plate (30).

The leaf spring abutment element (36) consists primarily of the polymer tube (38) which may be produced in varying lengths. Within the boundaries of the tube's (38) inner cylindrical surface is situated a threaded fastener (40) consisting of a metallic cylinder with a centrally located threaded socket. The threaded fastener (40) is used to secure the tube (38) to the upper horizontal plate (30) by means of the elongated threaded stud (34) fed through the opening (32) in the upper horizontal plate (30) and secured in the threaded socket. The threaded fastener (40) is held in place within the inner cylindrical boundaries of the tube (38) through friction and may be initially situated while the tube (38) is under compression and the diameter of its inner cylindrical boundary is temporarily extended.

In operation of the present invention (10), when a load exceeding the standard suspension system specifications is positioned upon the bed of the vehicle, the horizontal frame member (18) will move down relative to the position of the rear axle housing (12) through compression of the leaf springs (20). Upon compression of the vehicle, the end of the polymer tube (38) will come into contact with the upper surface of the leaf spring (20) positioned directly below it. Upon contact between the polymer tube (38) and the leaf spring (20), the operative length of the leaf spring (20) is effectively shortened as if its rear point of attachment was at the point where the polymer tube (38) is in contact instead of the mounting member (24). This compression of the polymer tube (38) against the leaf spring (20) effectively stiffens the spring keeping the rear of the vehicle closer to the proper (or normal) ride height which keeps the front of the vehicle down so the suspension geometry is correct, resulting in greater tire traction, less tire wear and better handling performance in general demonstrated by the solid line (B) in FIG. 1. This shifting effect redistributes the excessive load from the rear of the vehicle toward the front, thus, creating a more level vehicle and greater stability.

Resultant of effectively shortening the operative length of the leaf spring (20) through compression against the polymer tube (38), the vibrational energy emitted by the suspension system will experience a decrease in wavelength and resulting increase in frequency. As the polymer tube (38) is positioned against the leaf spring (28), which is the source of these emissions, the tube is in a position to adsorb this vibrational energy and re-disburse it in alternate forms. By varying physical properties of the polymer tube (38) such as shear durometer, ultimate tensile strength and compression set, one may provide for shock adsorption on any type of surface the vehicle may encounter. One need only replace the abutment element (36) with one produced with appropriate physical parameters. Listed below are the physical characteristics of six exemplary polyurethane compounds from which the abutment member tube (38) may be fabricated:

TABLE 2

| Typical Property of Compound No: | 1 | 2 | 3 | 4 | 5 | 6 |
| --- | --- | --- | --- | --- | --- | --- |
| Durometer (ASTM D2240-64T) | 60 A | 70 A | 80 A | 90 A | 45 D | 60 D |
| Compression Set: (ASTM D-395-81, Method B) 22 Hrs. @ 150° F. | 30% max. | 35% max. | 45% max. | 25% max. | 45% max. | 35% max. |
| Ultimate Tensile Strength: (ASTM D412-61T) | 2000 psi | 4000 psi | 6000 psi | 5000 psi | 5300 psi | 5000 psi |
| ASTM D418-61T @ 50% Elongation | 50 psi | 400 psi | 500 psi | 1100 psi | 1000 psi | 2300 psi |
| ASTM D418-61T @ 100% Elongation | 115 psi | 500 psi | 700 psi | 1600 psi | 1300 psi | 2800 psi |
| ASTM D418-61T @ 200% Elongation | 250 psi | 850 psi | 985 psi | 1900 psi | 1700 psi | 3000 psi |
| ASTM D4418-61T @ 300% Elongation | 300 psi | 900 psi | 1600 psi | 2300 psi | 2500 psi | 3600 psi |
| Elongation at Break (ASTM D-412-61T | 6.25 | 5.5 | 5.5 | 5.5 | 5 | 4 |
| Tension Set at Break (ASTM DA12-61T) | 0.05 | 0.05 | 0.25 | 0.35 | 0.2 | 0.3 |
| Tear Strength (ASTM D-1938) | 40 | 200 | 250 | 400 | 375 | 250 |
| Tear Strength (ASTM D-624) | 240 | 400 | 470 | 630 | 600 | 620 |
| Tear Strength (ASTM 470) | 25 | 70 | 140 | 200 | 170 | 220 |

Accordingly, it will be appreciated that the preferred embodiment shown herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. A universal high dampening load leveling apparatus, comprising:
   (a) an abutment member support adapted for universal attachment to a vehicle having a suspension system with leaf springs;
   (b) a generally cylindrical compressible abutment member comprising a resilient polymer tube having interior and exterior generally cylindrical vertical surfaces and generally flat horizontal top and bottom surfaces; said top surface having a threaded socket to removably receive a threaded fastener to attach said generally cylindrical abutment member to said abutment member support such that said abutment member is in compressible contact with the leaf springs of a vehicle whereby the operative length of the leaf springs is reduced so as to shift the fulcrum of the suspension system forward.

2. The apparatus of claim 1, wherein said abutment member support is generally L-shaped in elevation.

3. The apparatus of claim 2, wherein said generally cylindrical compressible abutment member is mounted onto said abutment member support so as to form a generally U-shaped apparatus in elevation.

4. The apparatus of claim 3, wherein said generally cylindrical compressible abutment member is fabricated from polyurethane.

5. The apparatus of claim 4, wherein said polyurethane has a durometer of between 60 A and 90 A.

6. The apparatus of claim 5, wherein said polyurethane has a durometer of approximately 45 D.

* * * * *